Figure 1:
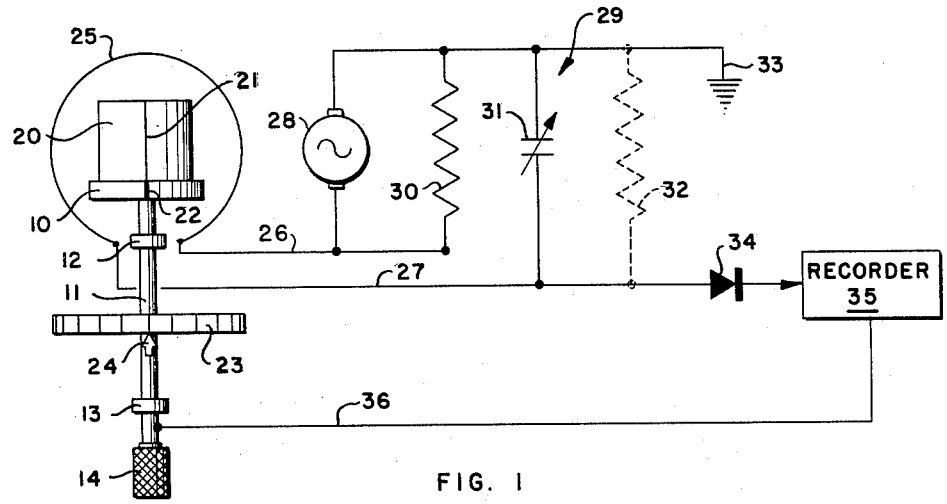

INVENTOR:
W. R. ORR 3,151,292
METHOD FOR DETERMINING DIRECTIONAL IN-
DUCTIVE ANISOTROPY OF MATERIALS BY
MEASURING Q FACTOR
William R. Orr, Bellaire, Tex., assignor to Shell Oil Company, New York, N.Y., a corporation of Delaware
Filed Nov. 29, 1960, Ser. No. 72,446
1 Claim. (Cl. 324—13)

This invention relates to a method and apparatus for determining a directional inductive conductivity anisotropy in substantially non-conductive solid substances and pertains more particularly to determining the predominate direction of orientation of the elongated grains or of the orientation of the pore spaces contained in an earth formation.

In a copending application of Arbogast, Fay and Kaufman entitled "Method and Apparatus for Determining Directional Dielectric Anisotropy in Solids," Serial No. 753,177, now Patent No. 2,963,642, filed August 1, 1958, there is described a method and apparatus for determining the dielectric anisotropy of a substantially nonconductive substance. As explained in this copending application, the reasons for some non-conductive materials possessing a dielectric anisotropy is not always clearly understood and the types of materials may comprise a uniform material having a series of voids or particles lying predominately in one portion of the material, a uniform material containing a number of elongated voids or particles uniformly distributed throughout and lying in a predominate direction, or a non-uniform material made up of a plurality of elongated particles and/or having a porous structure which is more porous in one direction than another.

When an electrode type of device is used to determine the conductivity anisotropy of a material the anomalous conductivity property of the material is determined by disposing a pair of electrodes to cause current to flow along a path that includes the material and changing the alignment between the electrodes and the material. In the case of earth formations the measurements are usually made in a direction parallel to the bedding planes of the formation and the current flow is parallel to the planes, thus the measurements are relatively insensitive to conductivity variation in directions perpendicular to the bedding planes.

In contrast to the above electrode conductivity device the present invention uses an inductive coil to induce an eddy current flow in the formation in loops whose axes are parallel to the bedding planes of the formation. When measurements are made along different directions parallel to the bedding planes they will reflect differences as a result of inhomogeneities in planes perpendicular to the bedding planes. Thus the use of inductive measurements to determine anisotropy provides valuable information which cannot be obtained through the use of conductivity type of measuring devices. The information obtained is useful in both geological exploration and production operations.

It has now been discovered that the orientation of the elongated grains or of the pore spaces of the formations can be determined by inductive measuring means. Furthermore, as a result of the equipment required for determining inductive anisotropies it is possible to determine the inductive anisotropy of a formation surrounding a borehole.

Accordingly, it is the principal object of this invention to provide a novel method and apparatus for determining the directional anisotropy of a formation by detecting inductive conductivity anomalies within the formation.

A further object of this invention is to provide a novel apparatus for determining the directional anisotropy of a formation surrounding a wellbore by detecting the inductive anomaly of the formation.

A further object of this invention is to provide a novel apparatus for determining an inductive anomaly of a formation utilizing the change in the Q factor of an inductive coil for determining the change in the inductive characteristics of the formation.

A still further object of the present invention is to provide a unique apparatus utilizing the change in the Q factor of a single turn inductive coil for determining the variation in the inductive characteristics of the formation surrounding a wellbore.

The above objects and advantages of this invention are achieved by utilizing the dissipation of electrical energy in the form of eddy currents in the formation being tested as a means for determining the changes in the inductive characteristic of the formation. By measuring the changes in the inductive characteristics with changes in direction in a plane parallel to the bedding planes of the formation, one can determine the direction of maximum inductive response. Thus, the anisotropy characteristics of the formation may be measured by inductive means. As explained above, the anisotropy indicates the direction or arrangement of elongated grains, or of the pore spaces of the formation. In order to determine the change in the inductive characteristic of the formation, an inductive coil having a single, or very few turns is used to induce eddy currents in the formation. The Q factor of the coil is then measured to determine the energy dissipated in the form of eddy currents in the formation and thus measures the change in the inductive characteristics of the formation. The coil may be wound with its axes parallel to the bedding planes of the formation and then either the formation rotated about an axis perpendicular to the bedding planes thereof or the coil may be rotated about an axis perpendicular to the bedding planes. When it is desired to determine the change in inductive characteristics of the formation surrounding boreholes and the like, a single turn rotating coil is utilized. The use of a rotating coil simplifies the construction of the logging instrument over the instruments designed for utilizing the dielectric method of determining the anisotropy of the formation surrounding a borehole as disclosed in the above copending application.

An important feature of this invention is the use of a single coil for both inducing the eddy current field in the formation and measuring the response of the formation to the induced field. As pointed out above this can be accomplished by measuring the Q factor of the coil which indicates the amount of energy dissipated in the form of eddy currents in the formation. Prior art devices have been devised for measuring the response of a formation to a magnetic field or for measuring the resistivity of a formation, but these have all utilized a source coil for inducing a vertical field in the formation and then a horizontal detector coil for determining the response of the formation to the induced field.

Figure 2:
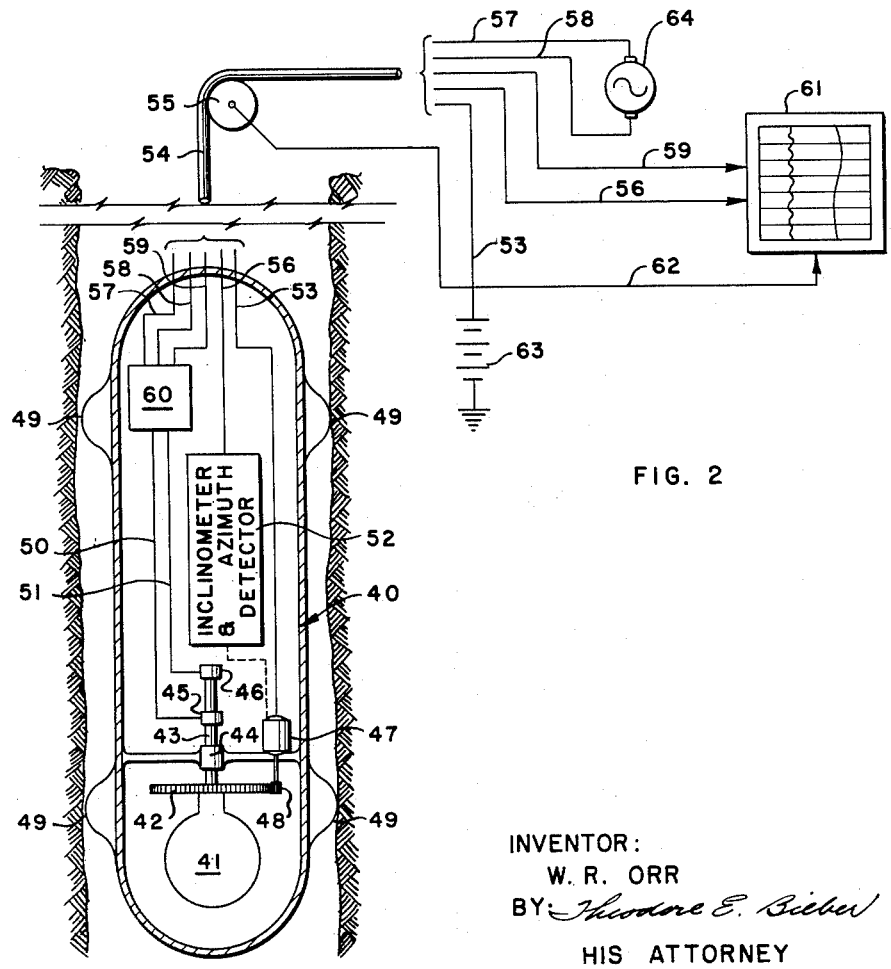

The above objects and advantages of this invention will be more easily understood from the following detailed description of preferred embodiments when taken in conjunction with the attached drawing, in which:

FIGURE 1 illustrates one form of this invention adapted to determine the inductive characteristics of a core sample; and, FIGURE 2 illustrates the second form of this invention adapted to log the formation surrounding the borehole.

This invention utilizes the dissipation of the energy of a magnetic field in the form of eddy currents in a formation to determine the inductive characteristics thereof. It is well known that whenever an alternating magnetic field is applied to a formation or other material, some of the energy of the field is dissipated, or lost, by the generation of eddy currents. In order to determine the amount of energy dissipated, the Q factor of the coil is measured as either the formation is rotated in the field of the coil or the coil is rotated in proximity to the formation. The "Q factor" of a coil is $\pi$ times the ratio of energy stored in an inductive coil during the time the magnetic field is being established to the losses introduced in the inductive coil during the same time period. This relationship is referred to as the quality or Q of the inductive coil and may be determined by various electrical measurements.

Referring now specifically to FIGURE 1 there is shown a sample holder 10 which is adapted to hold a core sample 20. The sample holder is mounted on a shaft 11 which is rotatably disposed in bearings 12 and 13. Means are provided on the shaft such as a knurl knob 14 in order that the sample holder and core sample may be rotated in the field of the coil 25.

The core sample 20 disposed in the sample holder is preferably a cylindrical shaped core which is orientated geographically by having a reference line 21 inscribed on one face of the cylinder. Furthermore, the core sample is preferably cut from the parent formation with the axis of the cylinder substantially perpendicular to the bedding planes of the formation. When the core sample is disposed in the sample holder 10 the reference mark 21 is aligned with a reference mark 22 on the sample holder. The zero position may be determined by rotating a synthetic core sample having a known direction of maximum conductivity in the sample holder.

Such a synthetic core sample can be made by a shorted turn of conductive material. For example a hollow tube having a circular shape and filled with a sodium chloride solution may be used. The shorted turn is embedded in a plastic cylinder in a slot which passes through a diometer. A reference mark, parallel to the cylindrical axis and intersecting the axis of the coil, is scribed on the side of the plastic cylinder. When such a synthetic core sample is placed in the sample holder with its reference mark aligned with the reference mark 22 on the sample holder, the zero position of the sample holder is determined by rotating it until the minimum Q reading for the inductive coil is obtained. This position will occur when a diometer of the shorted turn coincides with a diometer of the coil 25 and is the position of maximum eddy current loss. When this is obtained the reference mark 24 is positioned opposite the zero position on a disk 23 attached to the shaft 11. The disk 23 is divided into 360-degrees and thus one can accurately determine the angle displacement of the minimum Q reading of the coil from the orientation mark 21 on the core sample.

The inductive coil 25 is disposed so that it surrounds the core sample 20 and has its axis substantially perpendicular to the axis of the core sample. The inductive coil 25 is preferably formed from a single turn of conductive wire such as copper wire, although coils having a few closely spaced turns may also be used. A suitable coil may be formed of a single turn of one-fourth inch copper tubing or 1 to 100 turns of number 14 gauge copper wire. The coil 25 is connected by means of a lead 26 to a source of alternating current 28. The source 28 has preferably a relatively high frequency on the order of one megacycle per second or more. The use of 50 megacycles per second gives good results while frequencies of more than 1,000 megacycles per second are near the upper limit of the device. Above 1,000 megacycles the skin effect on the core sample becomes undesirably large. A low value resistor 30 is disposed in parallel with the source 28 and the source 28 resistor 30 combination is connected to a circuit 29 which is referred to as a Q meter circuit. The circuit 29 consists of a variable capacitance 31 with a resistor 32 representing the electrical losses in the circuit in parallel with capacitance 31. Thus, the capacitance 31 may be adjusted so that the series circuit resonates at the frequency of the power supply 28. One side of the circuit 29 is connected to a ground 33 while the other side of the circuit is connected to the lead 27 of the coil 25. The other side of the Q meter circuit 29 is also coupled through a diode 34 to a recording device 35. The recording device 35 is preferably a chart recorder, which records the change in the voltage across capacitor 31 which is related to the Q factor of the coil. The drive of the chart record as represented by the connection 36 is synchronized with the rotation of the sample holder to record the change in the Q factor with respect to the angle rotation of the sample holder.

When the above device is operated its zero position is first determined by the use of a synthetic core sample as described above. The core sample whose directional anisotropy is desired is then disposed in the sample holder after first being saturated with a conductive solution. For example, ordinary brine solution may be used for saturating the core. The coil 25 is then energized from the source 28 and the sample rotated in the magnetic field of the coil 25. As the sample is rotated the strip chart record 35 is advanced in synchronism therewith and a record of the change in the Q factor of the coil made. From an inspection of this record the direction of the minimum Q factor of the coil can easily be determined. This direction will coincide with the directional anisotropy of the sample. In place of the recorder 35 one could simply use a voltmeter and rotate the sample until the minimum Q reading is obtained. One could then determine the angular position of this minimum reading by noting the position of the disk 23 with respect to the reference mark 24.

Referring now to FIGURE 2 there is shown a logging apparatus utilizing the inductive measuring apparatus of FIGURE 1. The inductive coil 41 is mounted on a suitable supporting plate 42 and disposed within the housing 40 of the logging probe. No particular construction for the housing 40 is shown since the construction of such housings is well known in the art. The mounting plate is attached to a shaft 43 which is journaled in a bearing 44. Slip rings 45 and 46 are provided in the upper end of the shaft in order that the alternating current may be supplied to the coil 41 and the signal transmitted from the coil. A drive motor 47 is disposed in the housing and provided with a gear reduction 48 at its lower end for rotating the coil 41 about an axis substantially parallel with the axis of the borehole. The motor and gear train should be selected so that the probe coil rotates at a relatively slow speed on the order of 20 to 1,000 revolutions per minute.

Disposed within the housing 40 is an inclinometer and azimuth detector 52. While no construction is shown for the inclinometer and azimuth detector, many devices are available for this purpose. The inclinometer and azimuth detector is preferably of the type that transmits an electrical signal indicating the azimuth of the probe with relation to a geographical north and also a signal which indicates the inclination of the probe housing 40 within the borehole. In order to insure that the probe housing 40 remains substantially aligned with the borehole resilient centering means 49 are disposed on opposite ends of the housing 40. The leads from the inductive coil 41 are coupled to the slip rings 45 and 46 which in turn are coupled to the leads 50 and 51. The leads 50 and 51 serve to couple the inductive coil 41 to a Q meter measuring circuit 60 similar to the circuit shown in FIGURE 1 and described above. The alternating current power supply 64 for the inductive coil 41 and circuit 60 is located at the surface and coupled to conductors 57 and 58 contained in multi-conductor cable 54. Similarly the power lead from the motor 47 is connected to a conductor 53 in the cable while the output signal from the inclinometer and azimuth detector 52 is transmitted to the surface over a conductor 56 of the cable. The output signal from the Q measuring circuit 60 is transmitted to the surface over a conductor 59 in the cable 54. In addition to containing the five conductors 53, 56, 57, 58 and 59 the multi-conductor cable 54 should be attached to the probe housing and have sufficient strength to permit lowering of the probe into the wellbore and pulling it upwardly through the wellbore to perform the logging operation. The multi-conductor cable 54 passes over a measuring sheave wheel 55 at the surface which may be a Selsyn unit in order to generate an electrical signal related to the position of the probe within the wellbore. The conductors 56 and 59 which transmit the signals from the inclinometer and azimuth detector and the Q measuring circuit are coupled directly to a recording means 61. Similarly, the recording means 61 is driven by the signal from the Selsyn unit 55 in order that the signals from the downhole probe may be recorded in relation to the position of the probe within the borehole. The power lead 53 from the motor 47 is coupled to a suitable power source such as a battery 63.

When the above logging device is operated it may be lowered into the well and then withdrawn in order to log the formation surrounding the well. This will give a log indicating the change in the inductive characteristics of the formation surrounding the borehole with respect to the depth of the borehole. In some cases it may be desirable to position the logging device opposite a particular formation and then make a complete log of the formation in this position. This would result in a record having substantially the same form as the record obtained when the device of FIGURE 1 is utilized to log a particular core sample. In order to obtain a complete geological display of the formation in question, it will of course be necessary to position the logging device in a plurality of positions within the particular formation and obtain a log at each position.

While but two embodiments of this invention have been described in detail various modifications may be made therein. For example other Q measuring circuits than the circuit shown in FIGURE 1 are known to those skilled in the art and may be used. Accordingly, this invention should not be limited to the details described and shown but only to its broad spirit and scope.

I claim as my invention:

A method for determining the inductive anisotropy of a material comprising:

saturating a sample of the material with a conductive fluid;

placing a coil adjacent said sample and circulating an alternating electrical current through said coil to induce a flow of eddy current in the sample;

measuring the change in the Q factor of the circuit containing said coil and said sample as said coil and sample are rotated relative to each other about an axis perpendicular to the axis of said coil.

References Cited in the file of this patent

UNITED STATES PATENTS

| | | |
|---|---|---|
| 2,018,080 | Martienssen | Oct. 22, 1935 |
| 2,248,101 | Lohman | July 8, 1941 |
| 2,291,692 | Cloud | Aug. 4, 1942 |
| 2,334,393 | Dillon | Nov. 16, 1943 |
| 2,664,542 | Lynn | Dec. 29, 1953 |

OTHER REFERENCES

Journal of Applied Physics, supplement to vol. 30, No. 4, April 1959, pages 250 s, 251 s, article by Cole et al.